United States Patent

[11] 3,524,405

| [72] | Inventor | Glenn D. Garrison<br>Grand Rapids, Michigan |
|---|---|---|
| [21] | Appl. No. | 736,788 |
| [22] | Filed | June 13, 1968 |
| [45] | Patented | Aug. 18, 1970 |
| [73] | Assignee | Jarecki Corporation<br>Grand Rapids, Michigan |

[54] TOGGLE-ACTION PRESS
3 Claims, 8 Drawing Figs.

[52] U.S. Cl. .................................................. 100/257,
100/272, 72/441, 72/446, 72/451
[51] Int. Cl. .................................................. B30b 1/16
[50] Field of Search .................................................. 83/527,
530, 630; 72/441, 451, 446; 18/30LV, 30LT;
100/257, 281, 272, 295

[56] References Cited
UNITED STATES PATENTS

| 986,809 | 3/1911 | Derbyshire et al. | 100/272 |
| 1,774,245 | 8/1930 | Strout | 100/257UX |
| 2,113,115 | 4/1938 | MacMillin | 100/272XR |
| 2,408,379 | 10/1961 | Day | 100/272 |
| 2,979,975 | 4/1961 | Scholz et al. | 72/446 |

FOREIGN PATENTS

| 609,387 | 9/1948 | Great Britain | 72/451 |
| 615,857 | 7/1935 | Germany | 18/30 |

*Primary Examiner*— Billy J. Wilhite
*Attorney*— Glenn B. Morse

ABSTRACT: A press having relatively movable interconnected ram components, and a plurality of toggle assemblies interrelated at the joints to drive and accurately position one of the ram components.

Patented Aug. 18, 1970
3,524,405
Sheet 1 of 5
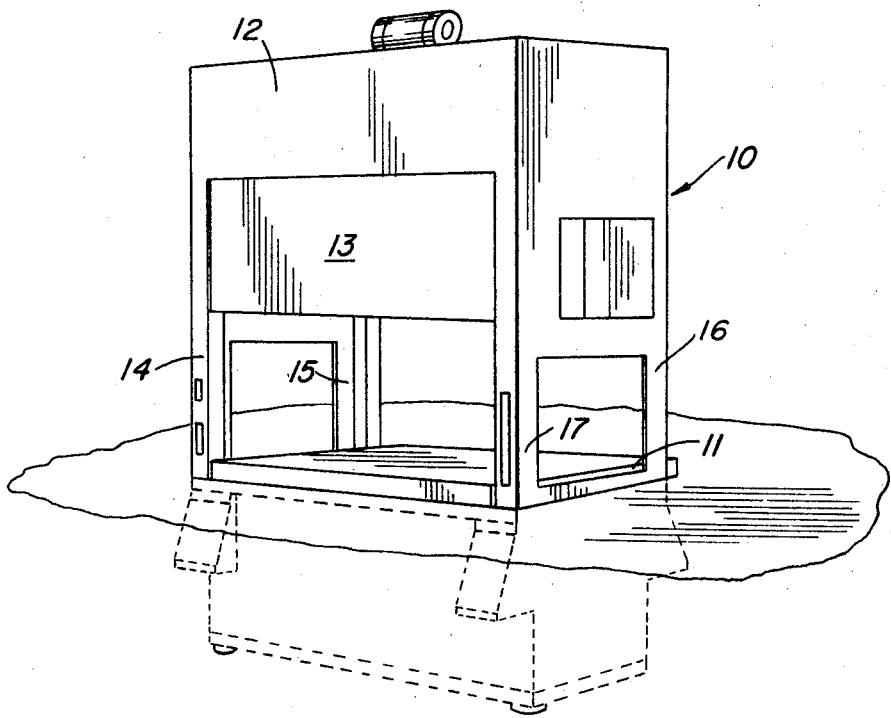
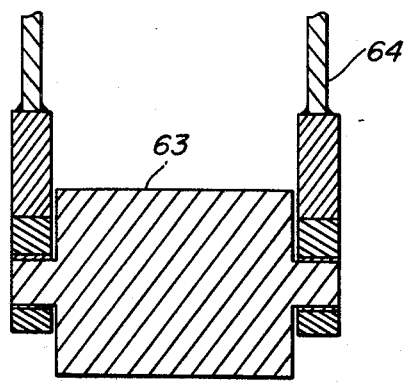
INVENTOR.
GLENN D. GARRISON
BY

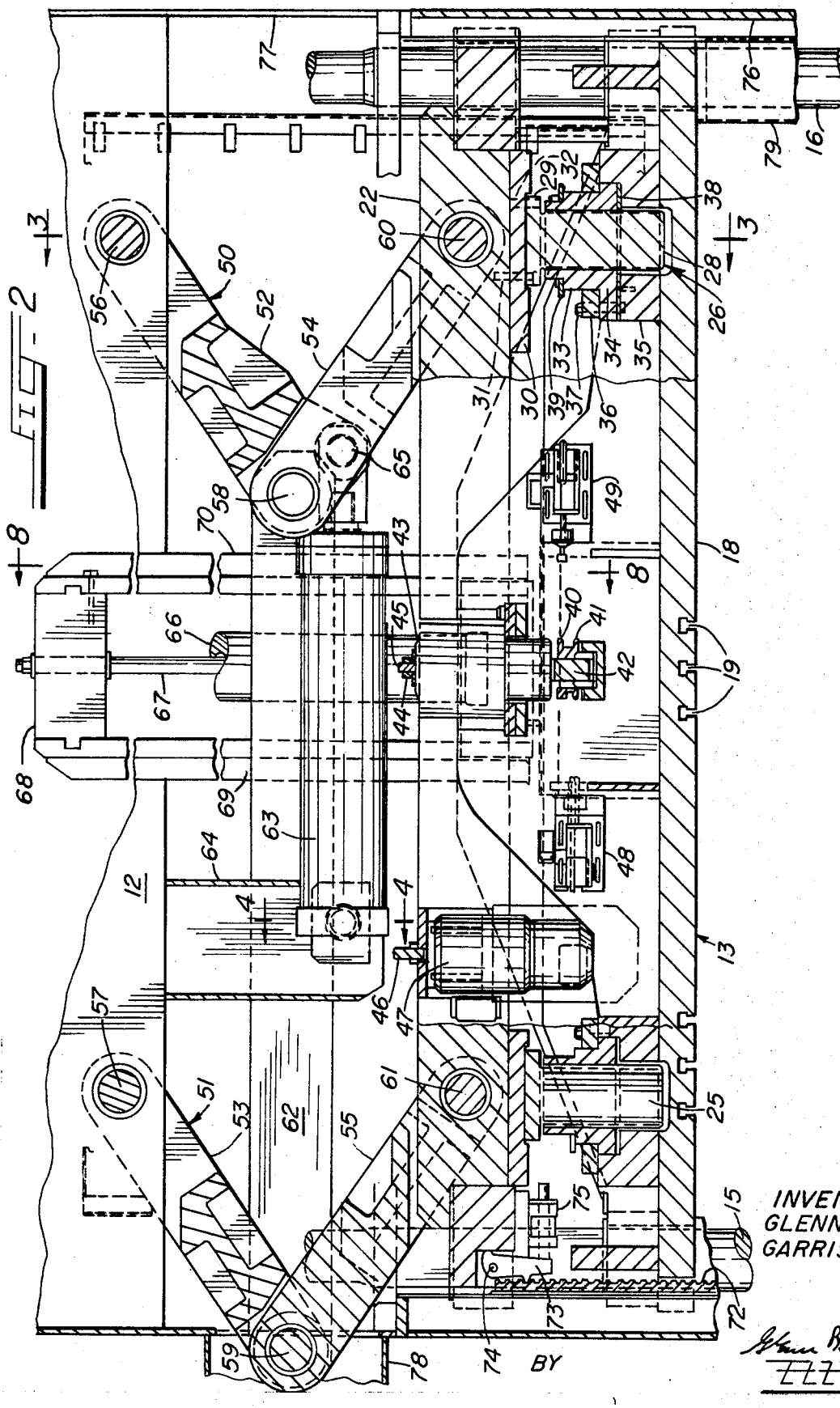

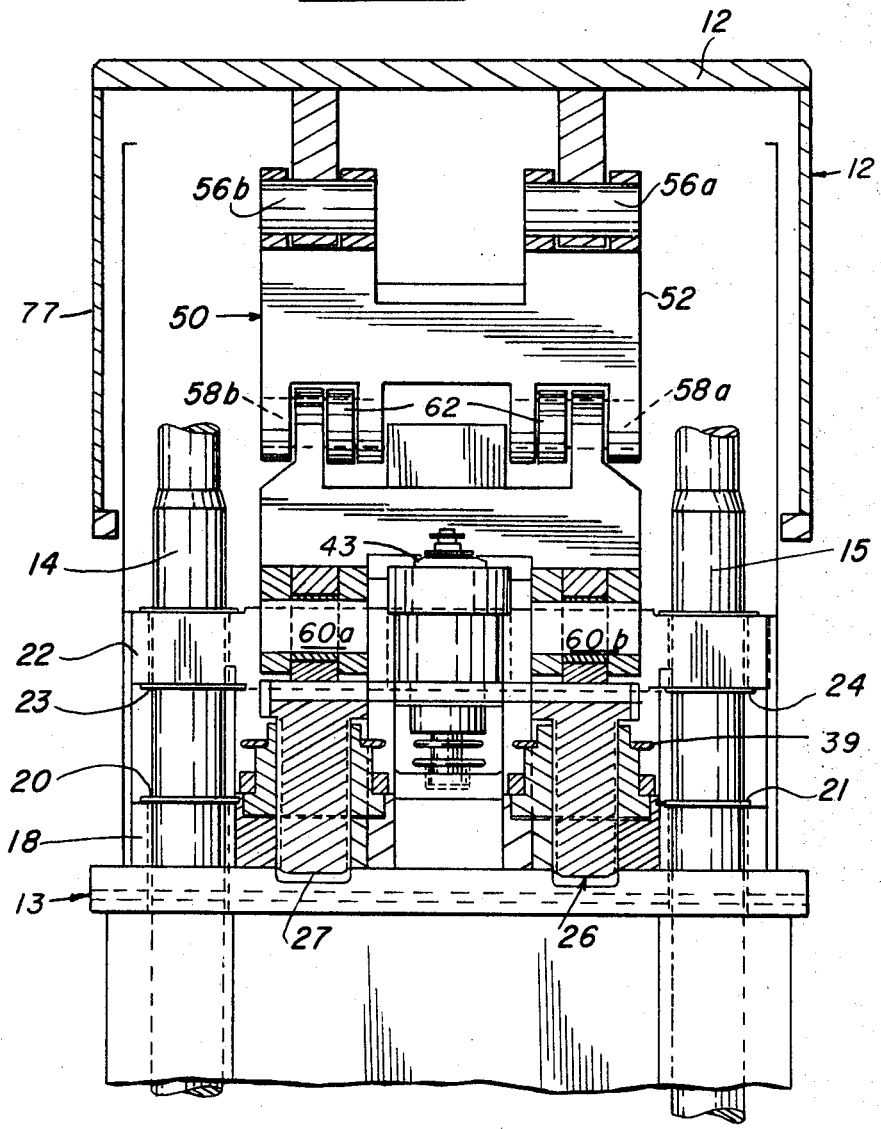

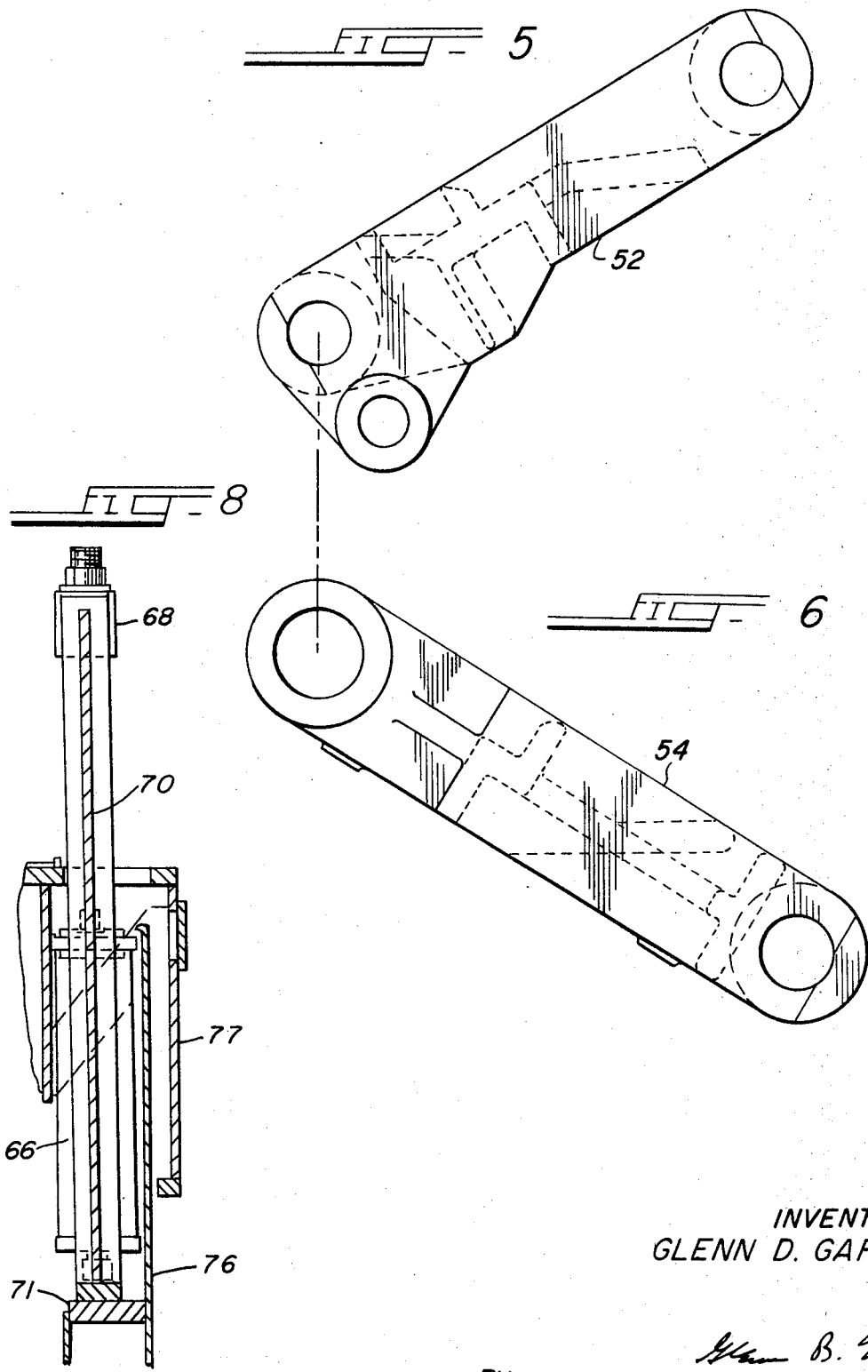

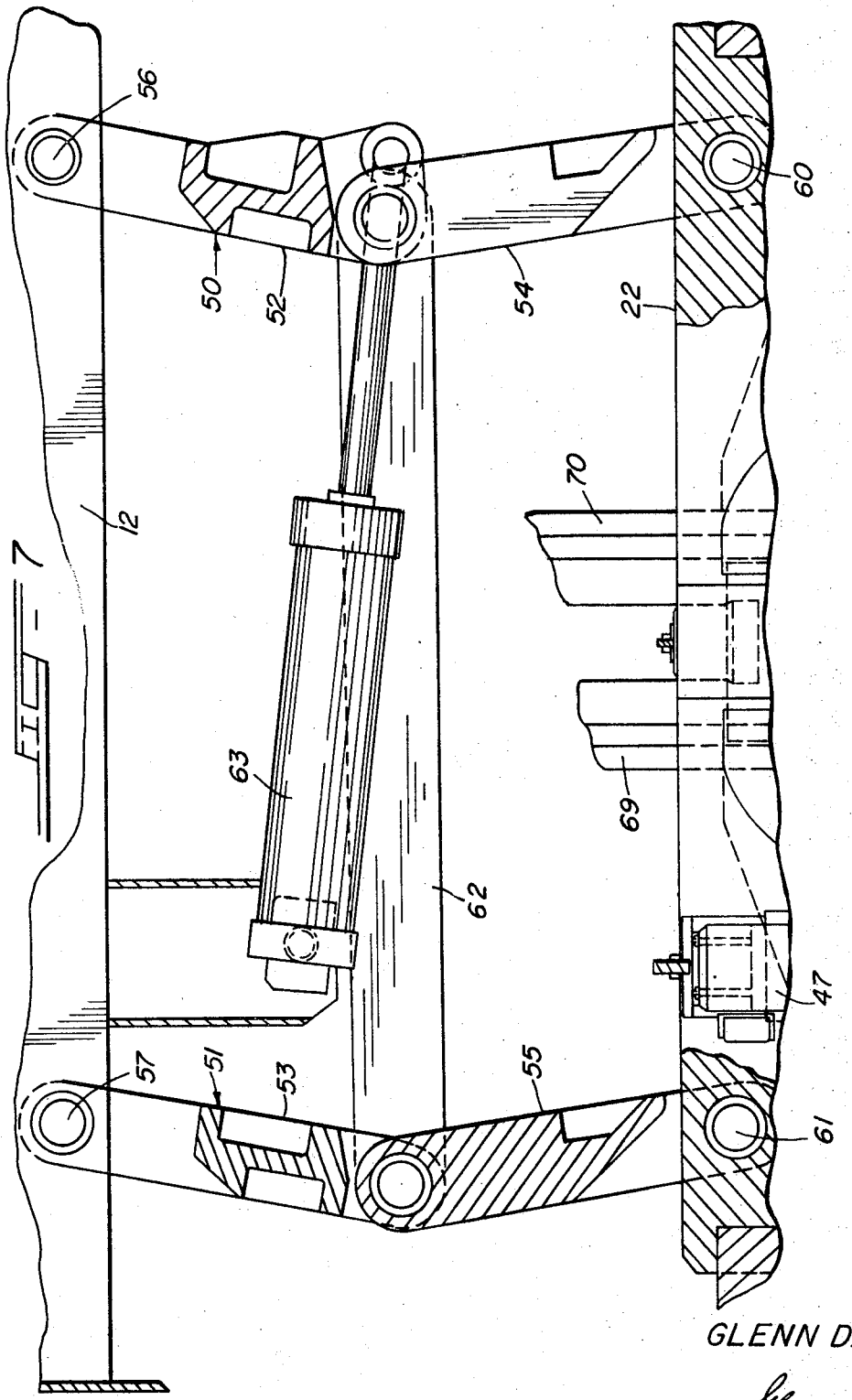

TOGGLE-ACTION PRESS

SUMMARY OF THE INVENTION

Large industrial presses have occasionally incorporated toggle mechanism to generate high mechanical advantage. A "toggle" is a common term indicating a pair of interconnected links extending between relatively movable machine components. A tremendous mechanical advantage can be generated by placing the "knuckle" of a toggle close to a line connecting the axes of pivotal connection of the links to the machine components, and then applying lateral forces to a convenient point on the links in a direction tending to move the knuckle joint toward or away from the line of centers. A relatively low force, with the toggle in this position, would generate a tremendous force urging relative movement between the machine components. The stroke of the movement will become less, of course, as the mechanical advantage increases. This feature is valuable in presses used on large dies, and the toggle mechanism has the added advantage of producing a rapid opening and closing travel when displaced substantially from the line-of-centers position. The present invention provides a more useful application of these features by interrelating the toggles with bars which extend between similar points on the links to assure that all of the toggle assemblies articulates in exactly the same manner. The interrelated toggles make it possible to provide a number of these points of application of force distributed across a relatively large press ram, with the assurance that all points on the ram will maintain parallelism with the press bed during the full travel of the ram. This feature is very important, as deviations from parallelism of the order of thousandths of an inch can render a press useless. The exact duplication of the movement of similar toggles by the interrelating bars assures that the central area of all the points of connection of the toggles to the ram will move vertically with exactly the same motion, thus assuring parallel positions of the ram with respect to a possible front-rear tilt axis. Stability about a possible side-to-side tilt axis is maintained by the use of axially spaced bearing sections on the pivot connections of the toggles, which cause the toggles to function as a stiffening beam interconnecting the ram with the fixed crown structure of the press at all times with respect to force tending to produce tilt of the ram in a vertical front-rear plane. The free action of the toggle system is maintained preferably by equipping each of these bearing sections and drive members with anti-friction bearings, so that the geometrical mechanical advantage is not dissipated. With this arrangement it is possible to develop a delivered mechanical advantage of six to eight times the lateral force of a hydraulic cylinder applied near the center of the toggle system.

The present invention provides a secondary ram-positioning system that can be used to place the die elements at closure at precisely the same moment that the toggle systems reach the small sector immediately adjacent the line-of-centers position, so that the force potentials are properly utilized. This secondary ram-positioning feature is obtained through the use of a double ram, in which the two ram elements are interconnected by interrelated screw jacks. The top ram element is driven by the toggle mechanism, and the bottom one will receive the upper die element in a down-travel press. It is also common practice to provide press-actuating mechanism on the under side of the press, in which case the ram moves upward toward a position of die closure. In the latter case, the toggle mechanism will be driving the lowermost of the two ram components, with the screw jack system extending upward to position the ram component which supports the lower die element.

The invention also incorporates a biasing cylinder system for applying forces directly parallel to the path of movement of the ram. The use of the dual actuation of the ram assembly makes possible a relatively gentle ram movement devoid from the mechanical advantage build-up characteristic of the toggle system. This auxiliary biasing system can either be used in light placement of the ram, or in ram positions in which the toggle links are approaching the maximum lateral displacement from the line of centers. The auxiliary biasing system can either accompany the normal actuation of the press by a hydraulic cylinder driving a central point on the toggle assemblies, or it can be operated separately for a number of purposes.

DETAILED DESCRIPTION

The several features of the invention will be analyzed in detail through a discussion of the embodiment illustrated in the accompanying drawings. In the drawings:

FIGURE 1 is a perspective view of an industrial press of the type in which the present invention is most easily incorporated.

FIGURE 2 is a transverse section on a vertical plane through the upper portion of the press illustrated in FIGURE 1, on an enlarged scale, with the ram in the elevated position.

FIGURE 3 is a section on the plane 3-3 of FIGURE 2.

FIGURE 4 is a section on the plane 4-4 of FIGURE 2.

FIGURE 5 is a side elevation of one of the upper toggle links.

FIGURE 6 is a side elevation of one of the lower toggle links.

FIGURE 7 illustrates the toggle system extended to a position approaching the "line-of-centers", which may be considered as the beginning of the portion of the ram stroke at which very high forces are generated.

FIGURE 8 is a section on the plane 8-8 of FIGURE 2.

The press generally indicated at 10 in FIGURE 1 includes a base 11, a fixed crown structure 12, and a ram assembly 13. The guides 14-17 extend between the base and the crown, and determine the vertical reciprocating path of movement of the ram assembly. The guides will normally be heavy cylindrical steel posts, which are occasionally covered with protective housings of sheet metal, as in the form illustrated in FIGURE 1. A large die will normally be placed on the base 11, with the lower section of the die securely bolted in place. The upper die section will be similarly bolted to the bottom of the ram assembly 13.

Referring particularly to FIGURES 2 and 3, the ram assembly includes a lower plate 18 provided with groups of T-slots 19 for receiving bolts used in securing an upper die section (not shown) in the gap between the ram and the base. The plate 18 is provided with bearing sleeves engaging each of the guideposts, as shown at 20 and 21 in FIGURE 3. The upper ram plate 22 is similarly provided with bearing sleeves around the same guideposts, as shown at 23 and 24. Were it not for the mechanism interengaging the upper and lower plates 18 and 22, they would be freely slidable with respect to each other along the guideposts. The principal mechanism having the function of interengaging the upper and lower ram plates centers in the screw jack mechanisms 25-27, and a fourth one of these mechanisms is disposed immediately behind the screw jack 27, as shown in FIGURE 3, and in front of the screw jack 25, as shown in FIGURE 2. These screw jacks are all substantially alike, and the detailed description of the mechanism 26 will apply equally to the others. The bolt 28 has a head 29 secured to the mounting plate 30 by screws 31 and locating pins 32. The plate 30 is fixed with respect to the upper ram plate 22, preferably by welding. A nut 33 is rotatably mounted so that its lower flange 34 is received within a locating recess in the block 35 welded to the lower ram plate 18. A retaining ring 36 engages the top of the flange 34, and is secured in position with bolts as shown at 37. A sufficient amount of axial freedom is provided between the retaining ring 36 and the bottom of the recess in the block 35 so that the nut may rotate. Preferably, a bearing ring is incorporated in the assembly as shown at 38 to function as a thrust bearing transferring the ram pressure.

Each of the nuts 33 is provided with a sprocket 39, and a chain (not shown) extends around the sprockets 39 associated with the screw jacks 26 and 27, and also around the upper central sprocket 40. The lower central sprocket 41 will receive a chain extending to the screw jacks at the opposite side of the press. The sprockets 40 and 41 are either integral, or secured together to the shaft 42 of the speed reducer 43 mounted in the central portion of the upper ram plate 22. The sprocket 44 is mounted on the input shaft 45 of the speed reducer, and receives a chain (not shown) driven through a suitable sprocket normally installed on the shaft 46 of the motor 47. Rotation of the motor 47 in either direction will induce either separation or approach between the upper and lower guide plates 18 and 22, depending upon the direction of rotation. Chain-tensioning devices of conventional design are preferably incorporated as shown at 48 and 49, but the structural details of these units form no part of the present invention.

The upper ram plate 22 is positioned with respect to the crown assembly 12 primarily by the toggle assemblies 50 and 51. These include the upper toggle links 52 and 53, and the lower toggle links 54 and 55. The upper links are connected to the crown assembly 12 by the pins 56 and 57, respectively, and the upper and lower links are interconnected by the knuckle pins 58 and 59. The lower extremities of the toggle assemblies are pivotally connected to the upper plate 22 by the pins 60 and 61. To stabilize the angular relationships between the upper and lower plates, and prevent deviations from parallelism, the pins 56-61 are separated into axially-spaced components shown with the "a"and "b"designations on FIGURE 3 . The two toggle assemblies 50 and 51 are interrelated by the bars 62 extending between the knuckle pins 58 and 59, so that any articulation of one toggle will be exactly duplicated by the other toggle.

Actuation of the toggle mechanisms is provided by the hydraulic piston-cylinder unit 63. This unit is pivotally supported at one end by the bracket 64 mounted on the crown assembly 12, and the opposite end of the unit is connected to the toggle link 52 by the pin 65. The axis of this pin is fairly close to the axis of the pin system 58, but need not be coaxial with it. The mechanical advantage of the pressure applied by the lower ram plate 18 to a die mounted in the press will be determined by the relationship of (a) the axis of the pin system 58 with a plane containing the axes pins 56 and 60, and (b) the location of the axis of the connecting pin 65 between the axes of the pin 60 and the pin 58. As the knuckle pin 58 approaches the "line of centers"(the plane containing the axes of the pins 56 and 60), the mechanical advantage applied to the force delivered by the piston 63 will become tremendous. The stroke of the ram assembly will proceed at a progressively decreasing rate as the mechanical advantage increases, according to the laws of geometry. The point at which these high forces (and low travel) are delivered to the die assembly mounted in the press can be determined by operation of the motor 47, which can be used to place the lower ram plate 18 to properly position the die components so that die closure corresponds to the sector of greatest mechanical advantage.

An auxiliary biasing system for applying vertical forces to the ram assembly (with respect to the crown structure) is provided by the vertical hydraulic cylinder 66. The upper portion of this cylinder is secured to the crown assembly, and the piston rod 67 extends upwardly to a cross member 68, which interconnects the rails 69 and 70. The lower extremity of these rails bears on the shelf 71 of the structure of the ram assembly associated with the lower plate 18. Actuation of this cylinder will permit the delivery of forces of selected intensity directly to the lower ram plate, without the intervention of a build-up of mechanical advantage through the toggle system. This feature is useful in the preparation of dies, and in other special situations. To further assist in the preparation and installation of dies between the base and crown of the press, it is preferable to incorporate a rack 72 mounted on structure fixed with respect to the guide posts. A dog 73 is pivotally connected at 74 to the upper ram plate 22, and the position of this dog is controlled by the solenoid 75. As a safety measure, the solenoid 75 may be actuated to maintain the engagement of the dog 73, and thus prevent inadvertent lowering of the ram assembly while workmen are placing or adjusting the die components.

It is preferable that a housing as shown at 76 be mounted on the ram assembly, and a similar housing 77 should be provided to cover the mechanism within the crown structure. The housing extension 78 is required to accommodate the extreme lateral position of the knuckle of the toggle 51. It is also desirable that some form of telescoping housing arrangements, as indicated at 79, be provided around the guidepost, so that the accuracy of these members can be safeguarded from wear which might result from accumulation of dust and abrasive particles adhering to the necessary oil or grease always present on these members.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A press having a base, a crown, guide means extending between the base and crown, and a ram assembly movable along said guide means, wherein the improvement comprises:
   a first plate component of said ram assembly;
   toggle means disposed at laterally spaced positions on said first plate component, said toggle means interconnecting said crown and said first plate component, and each including links interconnected to form a central knuckle joint;
   tie bar means interconnecting said toggle means, and operative to induce similar extension thereof;
   actuating means operative to induce articulation of said toggle means;
   a second plate component of said ram assembly; and
   interrelated screwjack means interconnecting said first and second plate components at positions opposite the points of connection of said toggle means with said first plate component, said screwjack means including a plurality of threaded members mounted in fixed position on said first plate component on axes parallel to said guide means, and also including nut means rotatably mounted and axially fixed on said second plate component, said nut means each having a sprocket engaging a chain interrelating said nut means.

2. A press as defined in Claim 1, wherein said first plate component has a central opening, and said second plate component has a motor adapted to drive said chain, and mounted opposite said opening whereby said motor is free to move within said opening as said first and second plate components are drawn together by said screwjack means.

3. A press as defined in Claim 1, including biasing cylinder means operatively connected (a) to structure fixed with respect to said crown, and (b) to said ram assembly, for extension and retraction on an axis substantially parallel to the path of movement of said ram assembly.